United States Patent
Fan et al.

(10) Patent No.: US 12,496,294 B2
(45) Date of Patent: *Dec. 16, 2025

(54) METHODS FOR IMPROVING EXERCISE PERFORMANCE AND ENDURANCE THEREOF

(71) Applicant: NANJING NUTRABUILDING BIO-TECH CO., LTD., Nanjing (CN)

(72) Inventors: Qiru Fan, Nanjing (CN); Kylin Liao, Nanjing (CN); Mingru Wang, Nanjing (CN)

(73) Assignee: NANJING NUTRABUILDING BIO-TECH CO., LTD., Nanjing (CN)

(*) Notice: Subject to any disclaimer, the term of this patent is extended or adjusted under 35 U.S.C. 154(b) by 955 days.

This patent is subject to a terminal disclaimer.

(21) Appl. No.: 17/640,894

(22) PCT Filed: Oct. 21, 2021

(86) PCT No.: PCT/CN2021/125259
§ 371 (c)(1),
(2) Date: Mar. 7, 2022

(87) PCT Pub. No.: WO2022/083685
PCT Pub. Date: Apr. 28, 2022

(65) Prior Publication Data
US 2023/0218590 A1    Jul. 13, 2023

Related U.S. Application Data

(63) Continuation-in-part of application No. PCT/CN2020/122334, filed on Oct. 21, 2020, now abandoned.

(30) Foreign Application Priority Data

Oct. 21, 2020  (WO) ............... PCT/CN2020/122334

(51) Int. Cl.
*A61K 31/4375*   (2006.01)
*A61K 9/00*      (2006.01)
*A61P 21/00*     (2006.01)
*A61P 39/06*     (2006.01)

(52) U.S. Cl.
CPC ........ *A61K 31/4375* (2013.01); *A61K 9/0056* (2013.01); *A61P 21/00* (2018.01); *A61P 39/06* (2018.01)

(58) Field of Classification Search
CPC .................................................. A61K 31/4375
See application file for complete search history.

(56) References Cited

U.S. PATENT DOCUMENTS

| | | | |
|---|---|---|---|
| 11,903,932 B2* | 2/2024 | Wang | A61K 31/4375 |
| 2002/0061339 A1 | 5/2002 | Stogniew et al. | |
| 2006/0223838 A1* | 10/2006 | Jiang | A61K 31/4375 514/284 |
| 2010/0113494 A1* | 5/2010 | Hu | A61P 3/06 514/279 |
| 2010/0260733 A1 | 10/2010 | Qi | |
| 2017/0296520 A1 | 10/2017 | Lowery et al. | |
| 2019/0255028 A1 | 8/2019 | Lowery et al. | |

FOREIGN PATENT DOCUMENTS

| | | |
|---|---|---|
| CN | 108295068 A | 7/2018 |
| CN | 108938618 A | 12/2018 |
| CN | 110101697 A | 8/2019 |
| JP | 5977919 B2 | 8/2016 |
| WO | 2020012175 A1 | 1/2020 |

OTHER PUBLICATIONS

Nigel Turner et al., "Berberine and Its More Biologically Available Derivative, Dihydroberberine, Inhibit Mitochondrial Respiratory Complex I", May 1, 2008, pp. 1414-1418, vol. 57, No. 5, Diabetes.
Imenshahidi Mohsen et al., "Oxidative Stress and Dietary Antioxidants in Neurological Diseases", Jan. 1, 2020, ScienceDirect.
Tanuj Joshi et al., "Targeting AMPK signaling pathway by natural products for treatment of diabetes mellitus and its complications", Mar. 27, 2019, pp. 17212-17231, vol. 234. No. 10, Journal of Cellular Physiology.
Hee Yun et al., "AMP-activated protein kinase mediates the antioxidant effects of resveratrol through regulation of the transcription factor FoxO1", Oct. 1, 2014, pp. 4421-4438, No. 19, FEBS Journal.

* cited by examiner

*Primary Examiner* — Rei Tsang Shiao
(74) *Attorney, Agent, or Firm* — ANOVA LAW GROUP, PLLC

(57) ABSTRACT

Provided are methods for improving exercise performance and endurance of a mammal, comprising administering to the mammal in need thereof a composition comprising dihydroberberine (DHB), or an analog or derivative thereof, and a physiologically acceptable carrier. DHB in the composition can serve as an antioxidant to defend red blood cells against oxidative stress damage, by scavenging reactive oxygen species generated during to increase the deformability and the survival of red blood cells.

19 Claims, 6 Drawing Sheets

METHODS FOR IMPROVING EXERCISE PERFORMANCE AND ENDURANCE THEREOF

CROSS-REFERENCE TO RELATED APPLICATIONS

This application is the US national phase of International Application No. PCT/CN2021/125259, filed on Oct. 21, 2021, which claims the benefit of Application No. PCT/CN2020/122334, filed on Oct. 21, 2020, the contents of which are incorporated herein by reference in their entirety.

BACKGROUND OF THE INVENTION

Erythrocytes or red blood cells (RBCs) carrying oxygen are very important for people to perform well during exercise[1]. However, RBCs are vulnerable to oxidative damage, because their continuous exposure to oxygen and their high concentrations of polyunsaturated fatty acids and heme iron[1a, 1c]. Oxidative stress refers to elevated intracellular levels of reactive oxygen species (ROS) that cause damage to lipids, proteins and DNA[2]. If the production of ROS is not controlled precisely and RBCs are not protected adequately during vigorous exercise, the damaged RBCs can also perturb ionic homeostasis and facilitate cellular dehydration, resulting in fatigue and eventually exerting detrimental effects on performance and endurances of exercise. Supplementation with antioxidants such as a-tocopherol has been reported to reduce these detrimental responses to some extent[3].

Adenosine monophosphate (AMP)-activated protein kinase (AMPK) is a heterotrimeric complexformed by $\alpha$, $\beta$, and $\gamma$ subunits. There are two isoforms of the $\alpha$ and $\beta$ subunits and three isoforms of the $\gamma$ subunit, giving rise to twelve possible combinations of the heterotrimeric $\alpha\beta\gamma$ AMPK complex[4]. AMPK is a cellular energy sensor and plays a critical role in maintaining redox homeostasis and regulating cellular energy metabolism. Theerythrocytes express AMPK, which inturn participates in the regulation of eryptosis, thesuicidal death of erythrocytes. AMPK-dependent survivalinfluences the life span of circulating erythrocytes[5].

Berberine (BBR) has been widely used throughout history as an antidiarrheic. In recent years, other bioactivities have been discovered for BBR, including antidiabetic, anticancer, cardioprotective, anti-inflammatory, and anti-hyperlipidemia effects. The fundamental mechanism of action underlying BBR's impact on human health is probably its action on the AMPK. However, in contrast with the significant pharmacological effects of BBR in the clinic, it has some major drawbacks-high dose, low bioavailability, and adverse gastrointestinal effects. Dihydroberberine ("dhBBR" or "DHB"), a hydrogenated derivative of BBR with improved absorption and oral bioavailability, displays similar potency to BBR to regulateAMPKO[6].

SUMMARY OF THE INVENTION

The present invention in general relates to dihydroberberine (DHB) compositions and methods of use thereof to improve the exercise performance and endurance in a subject.

The present invention provides a method for improving exercise performance and endurance of a mammal, comprising administering to the mammal in need thereof a composition comprising dihydroberberine (DHB), or an analog or derivative thereof, and a physiologically acceptable carrier. The benefit to the exercise regimen with the administration of the composition is significant when compared to the same exercise regimen without administration of the composition. Examples of the benefit may include, but are not limited to, improving performance and endurance of exercise of a mammal, reducing muscle fatigue of a mammal, improving the level of malondialdehyde (MDA) of the mammal, enhancing total antioxidant capacity (TAC) of the mammal, and/or reducing the free oxygen radicals of the mammal.

In some embodiments, the exercise regimen may comprise endurance training, resistance training, or a combination thereof.

In some embodiments, the composition used in the present invention is administered orally. The composition is administrated in a form selected from the group consisting of aqueous solutions, aqueous suspensions, capsules, drops, granules, liquids, powders, syrups, tablets, functionalized foods, beverages, and sublingual articles.

In some embodiments, the composition is an ingestible composition. The ingestible composition is selected from the group consisting of a bioceutical composition, a dietary supplement, a medicated feed, a nutraceutical composition, and a pharmaceutical composition.

In some embodiments, the mammal is a human.

In some embodiments, the composition is administered at least once per day for a period of between 1 week and 12 weeks, between 2 weeks and 12 weeks, between 3 weeks and 12 weeks, between 4 weeks and 12 weeks.

In some embodiments, the composition is administered to the mammal so that the daily intake of DHB is between about 1 mg/kg/day and about 200 mg/kg/day, or between about 1 mg/kg/day and about 150 mg/kg/day, between about 20 mg/kg/day and about 150 mg/kg/day, between about 50 mg/kg/day and about 150 mg/kg/day, between about 50 mg/kg/day and about 100 mg/kg/day.

In some embodiments, the composition is the dietary supplement. And the dietary supplement further comprises a flavor-containing solid, such as cocoa.

In some embodiments, the dietary supplement is administered to the mammal prior to a first exercise period.

In some embodiments, DHB improves exercise performance and endurance and/or reduces muscle fatigue by maintaining or increasing deformability, survival and function of carrying and releasing oxygen of red blood cells (RBCs).

Still in some embodiments, the exercise performance and endurance are assessed based on at least one of the following: a running distance, running time, highest running speed, a change in the submaximal running time to exhaustion at least 80% of the maximal heart rate (HRmax), a maximal rate of oxygen consumption (VO2max) and anerobic threshold.

In some embodiments, DHB in the composition is served as an antioxidant to defend RBCs against oxidative stress damage, by scavenging reactive oxygen species (ROS) generated during exercise to increase the deformability and the survival of RBCs. In some further embodiments, DHB protects red blood cells through activating AMP-activated protein kinase (AMPK).

In some embodiments, the antioxidant capacity is assessed based on at least one of the following: level of superoxide dismutase (SOD), catalase (CAT), malondialdehyde (MDA), reactive oxygen species (ROS), 2,3-diphosphoglycerate (2,3-DPG), total antioxidant capacity (T-AOC), AMPK and the free oxygen radicals.

As used herein, the term "or" is meant to include both "and" and "or". It may be interchanged with "and/or."

As used herein, "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

As used herein, the term "subject" is interchangeable and refer generally to an animal, including but not limited to a human, to which a composition or formulation of the invention is administered or is to be administered. Other animals that may be "subjects" as those terms are used herein include but are not limited to companion animals, such as cats, dogs, and horses; livestock animals, such as cattle, goats, sheep, and pigs; and rats.

As used herein, the term "physiologically acceptable" refers to what is generally safe, non-toxic and neither biologically nor otherwise undesirable and which is acceptable for pharmaceutical, cosmetic or food (human or animal) use, in particular food. "Physiologically acceptable salts" of a compound is taken to designate salts that are physiologically acceptable, as defined above, and which have the desired activity (pharmacological, cosmetic or food) of the parent compound.

As used herein, the term "effective amount" refers to an amount that is required to improve at least one symptom of a medical condition in an individual.

Chemical structures of Berberine and Dihyroberberine are shown below. Reduction of one double bond can result in the production of dihydroberberine (DHB).

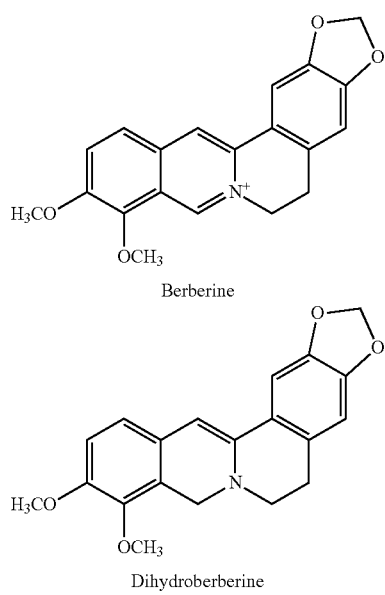

Berberine

Dihydroberberine

It is to be noted that the term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

It is to be expressly understood that, unless otherwise specified, all references to DHB herein encompass, in addition to DHB in its base form, any and all physically acceptable salts, polymers, esters, and acids thereof.

BRIEF DESCRIPTION OF THE DRAWINGS

For a more complete understanding of this disclosure and its features, reference is now made to the following description, taken in conjunction with the accompanying drawings, in which.

DETAILED DESCRIPTION OF THE INVENTION

Figure 1:
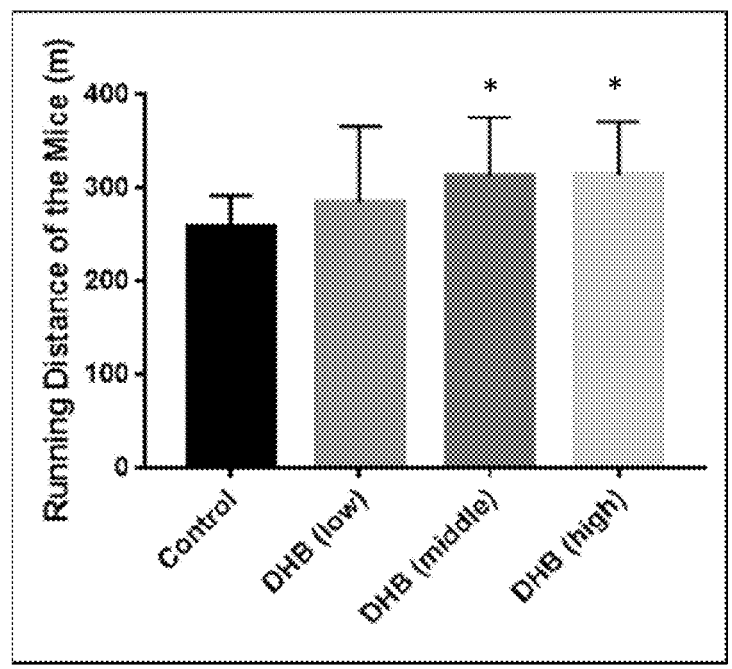
FIG. 1 shows the distance run by mice of each group during test. Data are present by mean±SD from 10 mice. The star (*) indicates the group with statistical significance ($p<0.05$).

The embodiments and configurations described herein are neither complete nor exhaustive. As will be appreciated, other embodiments of the invention are possible utilizing, alone or in combination, one or more of the features set forth above or described in detail below.

Embodiments of the present invention generally include an ingestible composition comprising dihydroberberine (DHB). Embodiments of the present invention also include methods of administration of such compositions to a mammalian subject, preferably a human, to improve the exercise performance and endurance, and/or reduce muscle fatigue, finally to enhance the benefits of exercise, including, but not limited to, losing weight, lowering a blood glucose, reducing a body fat percentage, reducing a weight, decreasing a blood triglyceride level, decreasing a blood total cholesterol level, decreasing a blood very low-density lipoprotein level, increasing a muscular glycogen storage capacity, increasing a hepatic glycogen storage capacity, reducing a mass of retroperitoneal fat, increasing a mass of a muscle and/or combinations thereof. The compositions and methods exhibit advantageous efficiency and health benefits compared to placebo or a mixture of vitamin C and E.

One advantage of the present invention is that it can be utilized alone, and/or it can be utilized in combination with, and thereby improve the exercise performance and endurance, and reduce muscle fatigue in a subject.

In some embodiments, suitable dosage amounts for the compositions and methods of the invention range from about 1 to about 200 mg/kg/day, e.g., from about 1 to about 150 mg/kg/day, from about 5 to about 150 mg/kg/day, from about 10 to about 150 mg/kg/day, from about 20 to about 150 mg/kg/day, from about 20 to about 120 mg/kg/day, from about 50 to about 150 mg/kg/day, from about 50 to about 100 mg/kg/day, or from about 50 to about 80 mg/kg/day.

In the methods of the treatment disclosed herein, the dosage may be varied during the course of supplementation. In some embodiments, two or more discrete dosage steps may be used, wherein a first dosage may be administered to the subject for a first period; and a second dosage, which may be higher or lower than the first dosage, may be administered to the subject for a second period. By way of non-limiting example, the first and second dosages may be between about 1 and about 200 mg/kg/day, and each of the first and second periods may be at least about one day, or at least about two days, or at least about three days, or at least about four days, or at least about five days, or at least about six days, or at least about one week, or at least about two weeks, or at least about three weeks, or at least about one month, or at least about two months, or at least about three months, or at least about four months, or at least about five months, or at least about six months, or at least about seven months, or at least about eight months, or at least about nine months, or at least about ten months, or at least about eleven months, or at least about one year. In some embodiments, the dosage may also be continually ramped (i.e. gradually increased) or tapered (i.e. gradually decreased). The use of two or more distinct dosages, or of a ramped or tapered dosing regimen, may be beneficial where, by way of non-limiting example, it is desired to treat two or more diseases or conditions, simultaneously and/or sequentially, or where the severity of a disease or condition to be treated may vary over time.

Ingestible compositions of the present invention may be provided in any suitable form and physical manifestation. By way of non-limiting example, the ingestible composition can be administered to a subject as a bioceutical composition, a dietary supplement, a medicated feed, a nutraceutical composition, and a pharmaceutical composition. By way of further non-limiting example, the ingestible compositions may be provided in any suitable physical form for oral administration, such as aqueous solutions or suspensions (e.g. an infused beverage, such as an energy beverage or energy "shot"), capsules (which may or may not be chewable), drops, granules, liquids, powders, syrups, tablets (e.g. chewable, saliva-soluble, and/or swallowable tablets), functionalized foods (e.g. energy or nutrition bars, cookies, gums, candies, etc.), sublingual articles, and the like. In some embodiments, the composition may be provided in a form, e.g. a powder, that can be applied to a food (similar to a seasoning or condiment, etc.) or mixed with a beverage. Ingestible compositions of the present invention may thus comprise any suitable nutritionally acceptable additives, binders, and/or fillers, and may also comprise an active nutritional agent other than DHB.

Preferred dosages and treatment lengths for the methods of the present invention may vary according to the particular condition to be treated and/or the particular physiological objective to be achieved. By way of non-limiting example, administration of compositions containing DHB may be continued for an indefinite period of time, e.g. as a maintenance regimen, or for continual or continuous enhancement of exercise performance.

The invention is further described by reference to the following non-limiting examples.

Example 1: Effects of Dihydroberberine Supplementation on Exercise Performance and Endurance Prior to the experiment, all mice were acclimatized on a treadmill by running at 15% incline and at 10 m/min for two days. After the 2-day acclimatization, 40 mice were randomly divided into four groups as followings (10 for each group): Control group (normal diet supplemented with distilled water), Dihydroberberine (high) group (normal diet supplemented with dihydroberberine 26 mg/kg daily), Dihydroberberine (medium) group: (normal diet supplemented with dihydroberberine 19.5 mg/kg daily), Dihydroberberine (low) group (normal diet supplemented with dihydroberberine 13 mg/kg daily). Each group was fed on a normal diet, other than that, three experimental groups were supplemented with dihydroberberine daily for two consecutive months, while the control group was only supplemented with distilled water at the same time. Exercise endurance of the mice was evaluated by treadmill running. At the beginning of the formal experiment, mice were placed on treadmill, running at 10 m/min for 20 minutes, and then the running speed was increased by 2 m/min every 2nd minutes. End point occurs if the mouse touched the shock grid of the treadmill three times or on the treadmill for 5 consecutive seconds without attempting to reengage the treadmill. At the end point, the running distance, highest running speed, total running time of the mice were recorded[7].

Figure 2:
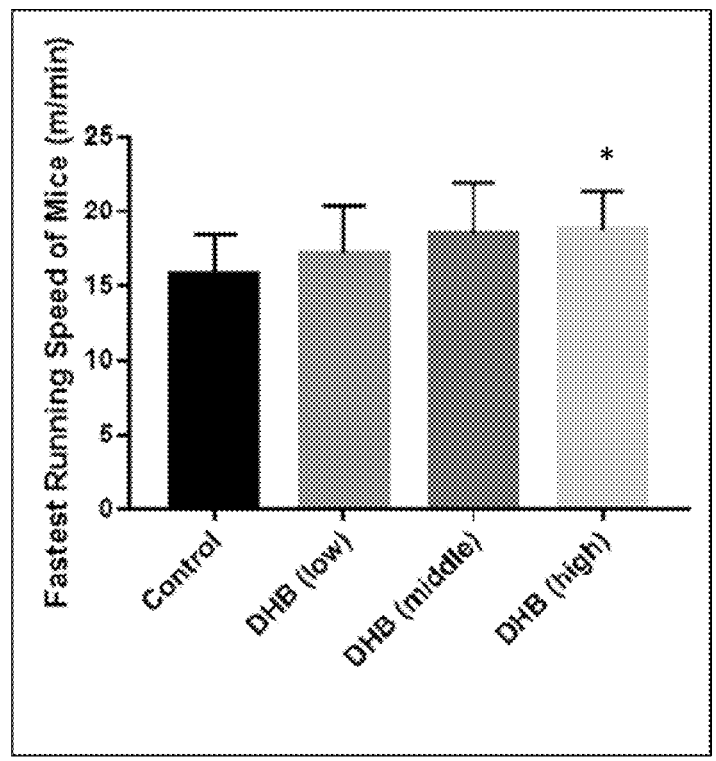
FIG. 2 shows the highest speed run by mice of each group.
Figure 3:
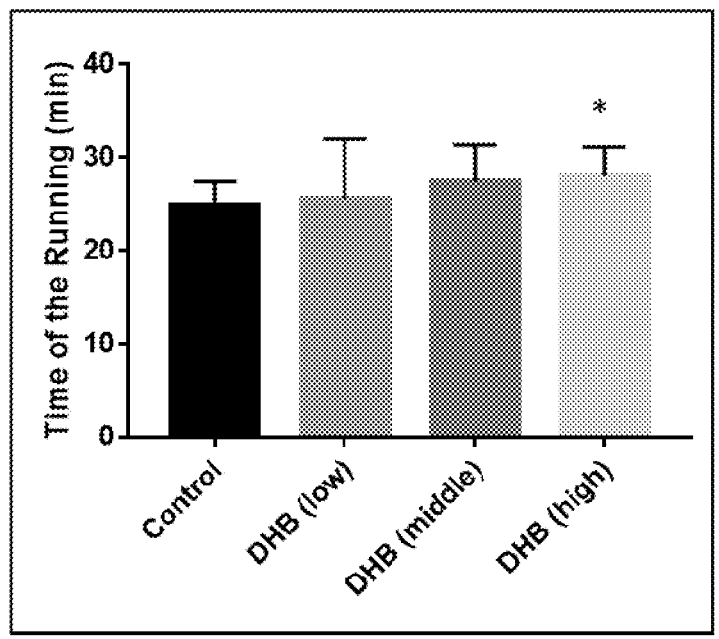
FIG. 3 shows the total time run by mice of each group.

FIGS. 1-3 show the exercise performance and endurance of mice after supplemented with DHB for two consecutive months. By comparing with the control group, the results showed that mice groups supplemented with DHB have enhanced endurance and better performance in terms of the running distance, running time, and highest running speed.

Example 2: Effects of Dihydroberberine Supplementation on Improvement of Antioxidant Capacity of RBCs and Plasma After the treadmill exhaustion test, blood samples were collected from the mice into heparin tubes. By centrifugation at 4500 rpm for 15 minutes, plasma was separated from the top layer of the whole blood and red blood cells were also separated from the lower layer of the blood. The levels of superoxide dismutase (SOD), catalase (CAT), and malondialdehyde (MDA) in the plasma were determined using commercially available kits.

Figure 4:
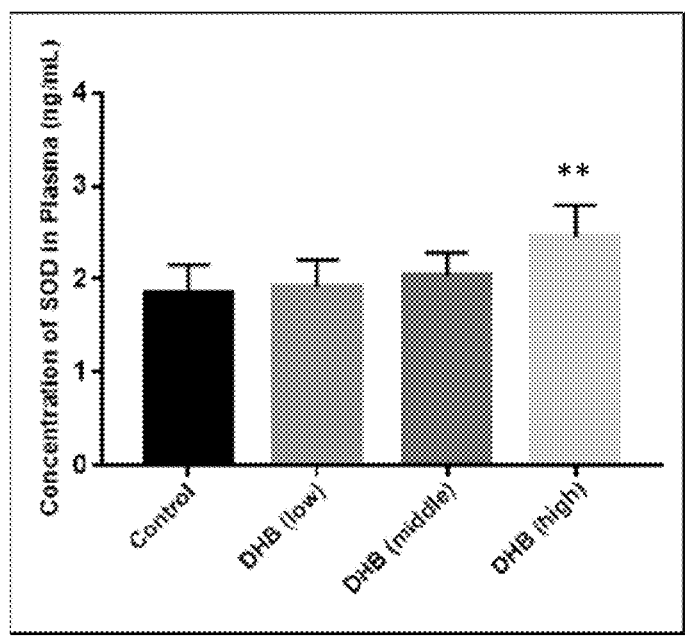
FIG. 4 shows SOD level in the plasma among different groups. Values are mean.

FIG. 4 shows SOD level in plasma among different groups. The results showed that SOD level in the groups supplemented with DHB is higher than the control group, especially in the group with high-dose of DHB, the SOD level in the plasma increased significantly ($p<0.01$).

Figure 5:
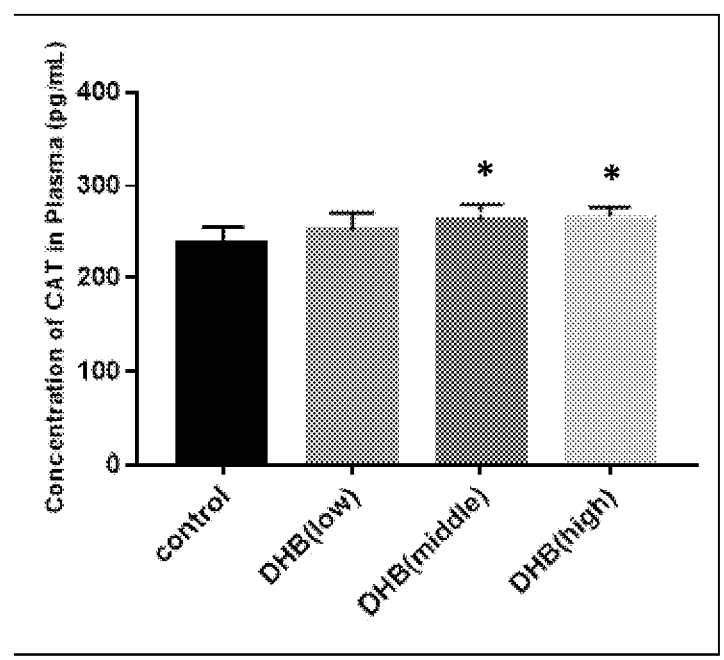
FIG. 5 shows CAT level in the plasma among different groups.

FIG. 5 shows CAT level in plasma among different groups. The results showed that CAT level in plasma also increased with administration of DHB. Especially, in the middle dose group and the high dose group, the CAT level increased significantly ($p<0.05$).

Figure 6:
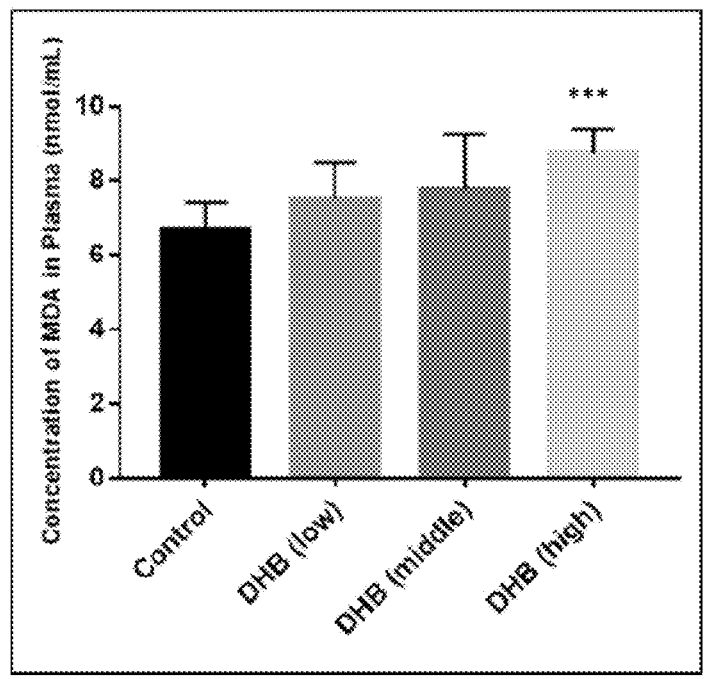
FIG. 6 shows MDA level in the plasma among different groups.

FIG. 6 shows MDA level in plasma among different groups. The results showed that MDA level in plasma increased with administration of DHB. Especially in high-dose group, the MDA level in plasma increased significantly ($p<0.001$).

The reactive oxygen species (ROS), 2,3-diphosphoglycerate (2,3-DPG), and total antioxidant capacity (T-AOC) in red blood cells were also determined using commercially available kits.

Figure 7:
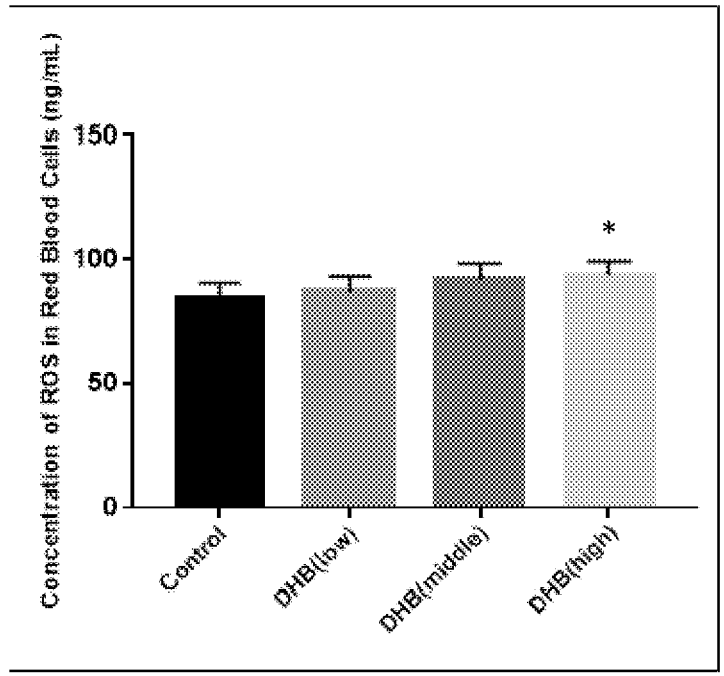
FIG. 7 shows ROS level in the red blood cells among different groups.
Figure 8:
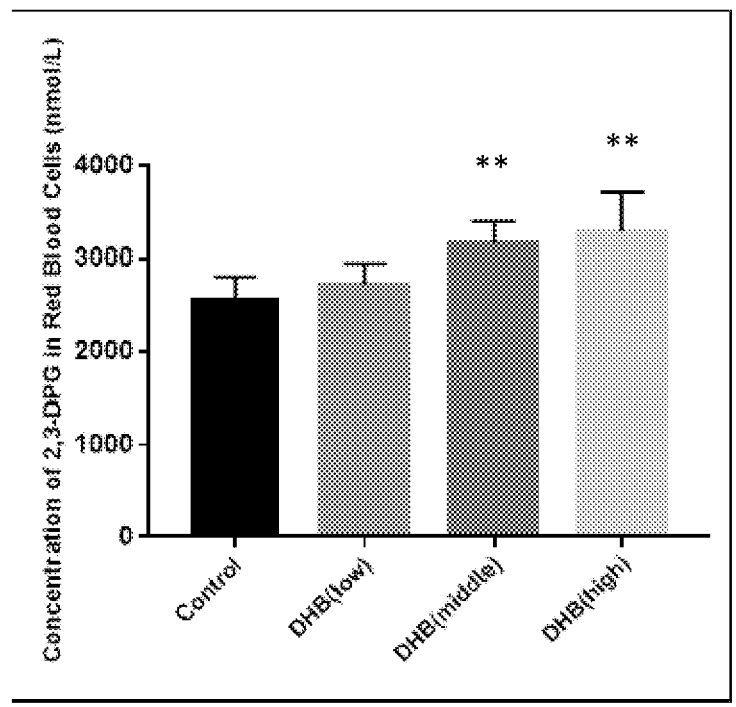
FIG. 8 shows 2,3-DPG level in the red blood cells among different groups.
Figure 9:
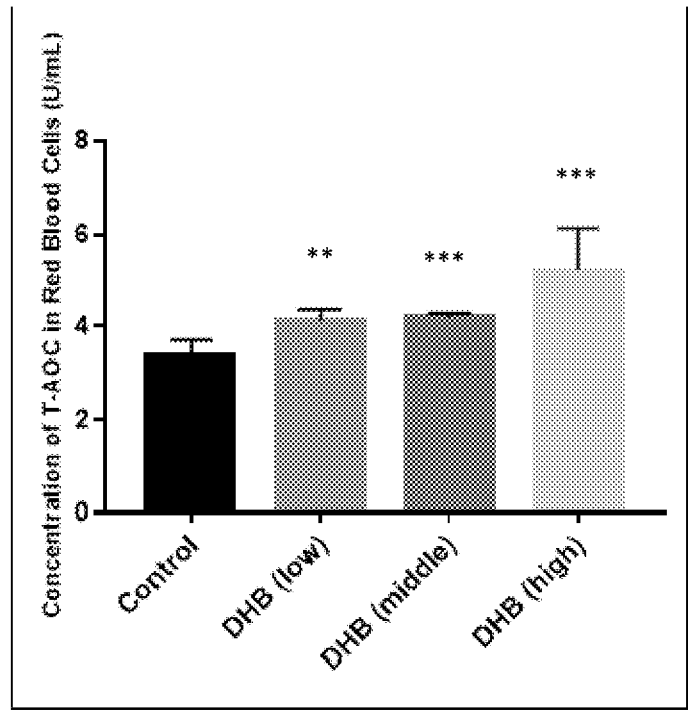
FIG. 9 shows T-AOC level in the red blood cells among different groups.

FIGS. 7-9 show the levels of ROS, 2,3-DPG, and T-AOC in the red blood cell, respectively. Results showed that levels of ROS, 2,3-DPG, and T-AOC in the groups supplemented with DHB were all increased. Especially, in the high-dose group, the T-AOC level increased significantly ($p<0.001$).

T-AOC and CAT are antioxidant indicators. The level of T-AOC can reflect the total antioxidant capacity of the body, including clearance of free radicals and the mutual interactions between antioxidants. T-AOC level can also reflect the general health status and age-related chances. Therefore, T-AOC is one of the best indicators to measure the capacity of an antioxidant in the biological organism[8]. Research showed that 2,3-DPG in red blood cells increases in response to anemia/hypoxia and causes a shift of the oxygen dissociation curve, allowing a more effective oxygen delivery. Hence, the increase of 2,3-DPG can indirectly indicate that DHB can promote the oxygen carrying capacity of red blood cells. Furthermore, 2,3-DPG modulates the effects of hydrogen ions and carbon dioxide upon hemoglobin $O_2$ affinity[10].

Figure 10:
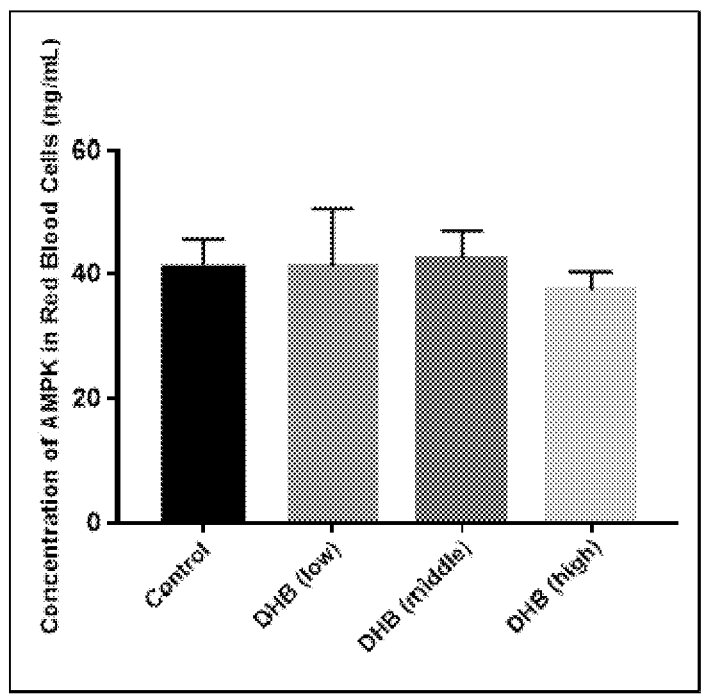
FIG. 10 shows the AMPK level in the red blood cells among different groups.

Acute exercise leads to AMPK activation through ROS, the activation of AMPK is deleterious to mature erythrocytes [11-12]. FIG. 10 shows AMPK level in red blood cells among different groups. The results showed that the level of AMPK in the group supplemented with high dose of DHB decreased slightly, indicating that DHB can maintain the homeostasis of AMPK in red blood cell, thereby protecting red blood cells from eryptosis.

Example 3. Statistical Analysis

T-test was used to determine statistical significance for the experiments, and a P value of less than 0.05 was considered significant. Values are expressed as mean±SEM or mean±SD (Prism 6; GraphPad Software).

REFERENCES

[1]. a). Smith J A. Exercise, training and red blood cell turnover. Sports Med. 1995; 19(1):9-31. b). Xiong Y, Xiong Y, Wang Y, et al. Exhaustive Exercise-induced Oxidative Stress Alteration of Erythrocyte Oxygen Release Capacity[J]. Canadian Journal of Physiology and Pharmacology, 2018 96(9). c). Clark M R. Senescence of red blood cells: progress and problems[J]. Physiol. Rev. 1988, 68(2):503-54.

[2]. a). Yu B P. Cellular defenses against damage from reactive oxygen species [published correction appears in Physiol Rev 1995 January; 75(1): preceding[J]. Physiol Rev. 1994; 74(1): 139-162. b). Curr Biol. 2014 May 19; 24(10): R453-R462.doi: 10.1016/j.cub.2014.03.034.

[3]. a). Goldfarb A H. Antioxidants: role of supplementation to prevent exercise-induced oxidative stress. [J]. Med, Sports Exerc, 1993, 25(2):232-236. b). Duranti G, Ceci R, Patrizio F, et al. Chronic consumption of quercetin reduces erythrocytes oxidative damage: Evaluation at resting and after eccentric exercise in humans. Nutr Res. 2018; 50: 73-81.

[4]. a). Ladli M, Richard C, Cantero Aguilar L, et al. Finely-tuned regulation of AMP-activated protein kinase (AMPK) is crucial for human adult erythropoiesis[J]. Haematologica, 2018, 104. b). Steinberg, G. R., Carling, D. AMP-activated protein kinase: the current landscape for drug development. Nat Rev Drug Discov 18, 527-551 (2019). https://doi.org/10.1038/s41573-019-0019-2

[5]. FOLLER M, SOPJANI M, KOKA S, et al. Regulation of erythrocyte survival by AMP-activated protein kinase [J]. FASEB J, 2009, 23(4): 1072-80.

[6]. a). FENG X, SUREDA A, JAFARI S, et al. Berberine in Cardiovascular and Metabolic Diseases: From Mechanisms to Therapeutics [J]. Theranostics, 2019, 9(7): 1923-51. b). Front. Pharmacol., 21 Mar. 2018.

[7]. Jisong A, Min J K, Ahyoung Y, et al. Identifying Codium fragile extract components and their effects on muscle weight and exercise endurance [J]. Food Chemistry. 2021.

[8]. CANBAZ H, Akca T, Tataroglu C, et al. The effects of exogenous L carnitine on lipid peroxidation and tissue damage in an experimental warm hepatic ischemia-reperfusion injury model [J]. Curr Ther Res Clin Exp, 2007, 68(1): 32-46

[9]. G. Birgegard B. Sandhagen. Erythropoetin treatment can increase 2,3-diphosphoglycerate levels in red blood cells [J]. Scandina-vian Journal of Clinical and Laboratory Investigation. 2001, 61(5): 337-340.

[10]. Jerry H. Meldon. Blood Gas Transportand 2,3-DPG [J]. Adv Exp Med Biol, 1985, 191: 63-73.

[11]. Meriem L, Cyrielle R, Lilia C, et al. Finely-tuned regulation of AMP-activated protein kinase is crucial for human adult erythropoiesis [J]. Red Cell Biology & its Disorders, 2019, 104.

[12]. Masaki T, Mirei T, Taku H. Possible involvement of AMPK in acute exercise-induced expression of monocarboxylate transporters MCT1 and MCT4 mRNA in fast-twitch skeletal muscle [J]. Metabolism, 2013, 1633-1640.

While specific embodiments and applications of the present invention have been illustrated and described, it is to be understood that the invention is not limited to the precise configuration and components described herein. Various modifications, changes, and variations which will be apparent to those skilled in the art may be made in the arrangement, operation, and details of the methods and systems of the present invention disclosed herein without departing from the spirit and scope of the invention. The examples and illustrations above are not intended to limit the scope of this invention. Any combination of compounds, methods, and applications of this invention, along with any obvious their extension or analogs, are within the scope of this invention. It is important, therefore, that the claims be regarded as including any such equivalent construction insofar as they do not depart from the spirit and scope of the present invention.

The advantages of the present invention will be apparent from the disclosure contained herein.

All publications or patent applications referred to above are incorporated herein by reference in their entireties. All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example of a generic series of equivalent or similar features.

What is claimed is:

1. A method for improving exercise performance and endurance of a mammal, comprising administering to the mammal in need thereof a composition which comprises a physiologically effective amount of dihydroberberine and a physiologically acceptable carrier, wherein the composition is administered to the mammal prior to an exercise period.

2. The method of claim 1, wherein the composition is administered orally.

3. The method of claim 1, wherein the composition is administrated in a form selected from the group consisting of aqueous solutions, aqueous suspensions, capsules, drops, granules, liquids, powders, syrups, tablets, functionalized foods, beverages, and sublingual articles.

4. The method of claim 1, wherein the composition is an ingestible composition.

5. The method of claim 4, wherein the ingestible composition is selected from the group consisting of a bioceutical composition, a dietary supplement, a medicated feed, a nutraceutical composition, and a pharmaceutical composition.

6. The method of claim 1, wherein the mammal is a human.

7. The method of claim 1, wherein the composition is administered at least once per day for a period of one to twelve weeks.

8. The method of claim 7, wherein the period is between four and twelve weeks.

9. The method of claim 1, wherein the composition is administrated to the mammal so that a daily intake of dihydroberberine is in an amount ranging from 1 mg/kg/day to 200 mg/kg/day.

10. The method of claim 9, wherein the amount ranges from 1 to 100 mg/kg/day.

11. The method of claim 5, wherein the composition is the dietary supplement.

12. The method of claim 11, wherein the composition further comprises a flavor-containing solid.

13. The method of claim 12, wherein the flavor-containing solid is cocoa.

14. The method of claim 11, wherein the dietary supplement is administered to the mammal prior to a first exercise period.

15. The method of claim 1, wherein dihydroberberine improves exercise performance and endurance and/or reduces muscle fatigue by carrying and releasing oxygen of red blood cells.

16. The method of claim 1, wherein the exercise performance and endurance are assessed based on at least one of the following: a running distance, running time, highest running speed, a change in the submaximal running time to exhaustion at least 80% of the maximal heart rate, a maximal rate of oxygen consumption and anaerobic threshold.

17. The method of claim 1, wherein dihydroberberine in the composition is served as an antioxidant to defend red blood cells against oxidative stress damage, by scavenging reactive oxygen species generated during exercise to increase a deformability and a survival of red blood cells.

18. The method of claim 17, wherein an antioxidant capacity of red blood cells and/or plasma is assessed based on at least one of the following: level of superoxide dismutase (SOD), catalase (CAT), malondialdehyde (MDA), reactive oxygen species (ROS), 2,3-diphosphoglycerate (2,3-DPG), total antioxidant capacity (T-AOC), AMPK and the free oxygen radicals.

19. The method of claim 1, wherein administration of dihydroberberine to the mammal prior to the exercise period is to maintain a homeostasis of adenosine monophosphate (AMP)-activated protein kinase (AMPK) in red blood cells during the exercise period.

* * * * *